United States Patent [19]

Hille et al.

[11] Patent Number: 5,759,963

[45] Date of Patent: Jun. 2, 1998

[54] USE OF ACETALS

[75] Inventors: Martin Hille, Liederbach; Heinz Wittkus, Frankfurt am Main; Bernd Windhausen, Brechen; Hans Jürgen Scholz, Alzenau; Frank Weinelt, Burgkirchen, all of Germany

[73] Assignee: Hoechst Aktiengesellschaft, Frankfurt, Germany

[21] Appl. No.: 116,483

[22] Filed: Sep. 3, 1993

Related U.S. Application Data

[63] Continuation of Ser. No. 879,816, May 7, 1992, abandoned.

[30] Foreign Application Priority Data

May 8, 1991 [DE] Germany .................... 41 15 055.4

[51] Int. Cl.$^6$ ........................................... C09K 7/02
[52] U.S. Cl. ............................... 507/136; 507/905
[58] Field of Search ............................. 507/136, 905

[56] References Cited

U.S. PATENT DOCUMENTS

| | | | |
|---|---|---|---|
| 2,366,737 | 1/1945 | Loder et al. | 507/136 X |
| 3,846,319 | 11/1974 | Hotten | 252/49.5 |
| 3,900,411 | 8/1975 | Andress, Jr. et al. | 252/52 |
| 4,349,443 | 9/1982 | Block | 252/8.5 |
| 4,395,267 | 7/1983 | Sweeney | 44/56 |

FOREIGN PATENT DOCUMENTS

| | | |
|---|---|---|
| 2057005 | 11/1990 | Canada . |
| 2058636 | 11/1990 | Canada . |
| 0 019 999 | 12/1980 | European Pat. Off. . |
| 0 398 112 | 11/1990 | European Pat. Off. . |
| 0 398 113 | 11/1990 | European Pat. Off. . |
| 2 110 227 | 6/1983 | United Kingdom . |

OTHER PUBLICATIONS

Emulsion Technology, Chemical Publishing Co., pp. 291–292, (1946).

Patent Abstracts of Japan, vol. 007, No. 077, Publ. No. JP 58008797, Mar. 30, 1983.

Database WPIL, AN 87–255335 of SU-A-899 625, Jan. 23, 1982.

Database WPIL, AN 82–01828J of SU-A-1283 359, Jan. 15, 1987.

J. T. Baker Chemical Company Catalog, 1980, p. 33.

*Primary Examiner*—Philip Tucker
*Attorney, Agent, or Firm*—Connolly and Hutz

[57] ABSTRACT

Acetals are used as a mineral oil substitute, oil component or base oil in invert-emulsion drilling muds, emulsion drilling muds, engine oils, gearbox oils, lubricating oils and also metal-working fluids, coolants, cooling lubricants and hydraulic fluids. As compared with conventional mineral oils, acetals show good biodegradability and are less toxic.

17 Claims, No Drawings

USE OF ACETALS

This application is a continuation of application Ser. No. 07/879,816, filed May 7, 1992, now abandoned.

Mineral oils are in many cases the base oils or components for invert-emulsion drilling muds, emulsion drilling muds, engine oils, gearbox oils and lubricating oils and also metal-working fluids, coolants, cooling lubricants and hydraulic fluids. Their biodegradation proceeds relatively slowly and incompletely.

Mineral oil fractions are predominantly or widely used for invert-emulsion drilling muds, emulsion drilling muds, engine oils, gearbox oils and lubricating oils and also metal-working fluids, coolants, cooling lubricants and hydraulic fluids. To satisfy the intended use, they are processed, and suitable additives are added. More recently, increasingly more biodegradable products are demanded for ecological reasons. This is particularly important if some contamination of the environment can never be completely excluded, such as is the case especially in drilling for petroleum and natural gas. Invert-emulsion drilling muds (water-in-oil emulsions) and emulsion drilling muds (oil-in-water emulsions) are used for this purpose. The invert-emulsion drilling muds with the hydrocarbon as the continuous phase are of greater importance. With this mud type, all the solids, the rock drilled off by the bit, the well walls and the drill pipes are wetted with oil owing to the addition of additives. As a result, the well walls are very satisfactorily stabilized and friction during drilling is minimized. The drill cuttings separated off above ground are wetted with oil and require separate disposal. Ecological problems arise offshore if the drilling mud or mud volumes pass into the sea. The drilling mud then sinks to the sea floor, where it renders all living organisms hydrophobic, i.e. kills them in its area of spread. A particular disadvantage here is the poor biodegradability and toxicity of the oils used. Originally, diesel oil was used. More recently, increasingly more highly purified oils of lower toxicity with less than 0.5% of aromatics are used.

Compounds such as alcohols (EP-A-0,398,112), esters (EP-A-0,398,113) and ethers (EP-A-0,391,251) have been proposed and tested as more readily biodegradable base oils. With respect to toxicity and biodegradability, these products are a step forward, but the demands to be met by a base oil with respect to pour point, viscosity, saponifiability and odor considerably restrict their use. Surprisingly, it has now been found that, using acetals, the properties of the base oils can be optimized by the selection of the aldehydes and alcohols. This is particularly important for the pour point and the viscosity.

The invention thus relates to the use of acetals in invert-emulsion drilling muds, emulsion drilling muds, motor oils, gearbox oils and lubricating oils and also in metal-working fluids, coolants, cooling lubricants and hydraulic fluids. They wholly or partially replace the hitherto known base oils, oil components and mineral oils here.

As a protective function for aldehydes, acetals are of great importance in preparative organic chemistry. Aldehyde groups are converted into acetals by means of alcohols, various reactions, including reactions under aggressive conditions, are then carried out in the neutral and alkaline range, and the acetal is cleaved again into alcohols and aldehyde in the acidic range.

The acetals according to the invention are synthesized by elimination of water from aldehydes and alcohols in the acidic range. Their known high stability in the alkaline range makes it possible to optimize the alkalinity in invert-emulsion drilling muds, for example, with calcium hydroxide, which has a particular advantage over ester-based oils. The acetals can be converted by a simple acid treatment into the very easily biodegradable components, if the already high degradability is to be further increased.

Aldehydes having 1 to 25 carbon atoms are particularly suitable for preparing the compounds according to the invention. They can be branched or unbranched, saturated or unsaturated and aliphatic or aromatic. Preferably, $C_1$- to $C_{10}$-aldehydes are used. The alcohols used are especially monohydric alcohols having 1 to 25 carbon atoms, preferably 4 to 20 carbon atoms. They can be branched or unbranched, saturated or unsaturated and aliphatic or aromatic. The acetals can be composed of a mixture of different alcohols and/or aldehydes or of pure alcohols and/or aldehydes of the same chain length. The compounds according to the invention can also be prepared on the basis of divalent aldehydes, especially those having 2 to 10 carbon atoms, such as glyoxal, tartaric acid dialdehyde, succindialdehyde, maleic acid dialdehyde and fumaric acid dialdehyde, but preferably glyoxal, with said alcohols.

Because further additives, which improve the lubricating and other properties, are highly soluble in the acetals, the acetals are very suitable as base oils, oil components, mineral oil substitute or mixing components for invert-emulsion drilling muds, emulsion drilling muds, engine oils, gearbox oils and lubricating oils and also metal-working fluids, coolants, cooling lubricants and hydraulic fluids. A particular advantage of the acetals is that they are partially miscible with mineral oil fractions and polyglycol ethers, so that the acetals can also be used together with these compounds.

As a component in the invert-emulsion drilling muds, emulsion drilling muds, engine oils, gearbox oils and lubricating oils and also metal-working fluids, coolants, cooling lubricants and hydraulic fluids, the acetals are usually present in a quantity of at least 0.5% by weight. In the case of partial to complete substitution for the existing base oils or the oily phase, they form up to 100% by weight of these fluids, with the exception of the emulsion drilling muds, in which their content is at most 50% by weight (the remainder being water).

The invention is explained in more detail by reference to the examples which follow.

General instructions for the preparation of the acetals used in the following Examples I to IX:

3.5 mol of aldehyde, 14 mol of alcohol and 500 g of n-hexane, methylene chloride or chloroform are mixed, 1 g of p-toluenesulfonic acid is added as catalyst and the mixture is heated to the boil. The water formed is distilled off azeotropically. After the formation of water has ended, the mixture is rendered alkaline with Na methylate solution, and the entrainer and the unreacted alcohol are then distilled off. The precipitated salt is then filtered off from the acetal which can be distilled if desired.

Physical data

EXAMPLES I TO IX

| | Description | Melting point | Boiling point | $n_D^{21}$ | Viscosity mPas, 15° C. |
|---|---|---|---|---|---|
| I | Acetaldehyde di-n-hexylacetal | <−60° C. | 246° C. | 1.4235 | 2.76 |
| II | Acetaldehyde | <−60° C. | 269° C. | 1.4350 | 5.19 |

-continued

| | Description | Melting point | Boiling point | $n_D^{21}$ | Viscosity mPas, 15° C. |
|---|---|---|---|---|---|
| | di-2-ethylhexyl-acetal | | | | |
| III | Butyraldehyde di-n-butylacetal | <−60° C. | 196° C. | 1.4160 | 1.9 |
| IV | Isobutyraldehyde di-n-hexylacetal | <−60° C. | 251° C. | 1.4270 | 3.8 |
| V | Isobutyraldehyde di-n-octylacetal | <−40° C. | 230° C. | 1.4351 | 7.7 |
| VI | n-Butyraldehyde di-n-octylacetal | <−60° C. | 224° C. | 1.4370 | 7.6 |
| VII | Isononylaldehyde bis-$C_{12/14}$-acetal | −15° C. | 239° C. | 1.4488 | 40.6 |
| VIII | Isononylaldehyde bis-$C_{16}$-acetal | −42° C. | 300° C. | 1.4536 | 183 (20° C.) |
| IX | Glyoxal tetrabutyl-diacetal | <−70° C. | 278° C. | 1.4260 | 6.7 |

The values given in the list for melting point (pour point) and viscosity of the acetals demonstrate the wide applicability according to the invention of these compounds.

Laboratory testing of acetals as substitutes for mineral oils in invert-emulsion drilling muds Mud formulation 245 ml of acetal according to the invention are placed into a Hamilton Beach (HB) mixer. The HB mixer is switched on in the "high-speed" position. In portions, 8 g of ®Tixogel (bentonite rendered hydrophobic, from Südchemie), 9 g of anionic emulsifier (70%, dodecylbenzenesulfonate), 3 g of cationic emulsifier (85%, imidazoline type) and 10 g of CaO are added. The mixture is stirred for 5 minutes. 105 ml of $CaCl_2$ solution (20%) are then added in portions.

After a further 10 minutes stirring time, 275 g of barium sulfate are introduced, which raises the density of the mud to 1.46 g/cm³. The complete mud is stirred again for 20 minutes. This is followed by measurements of the rheology (at 50° C.) and of the water loss (25° C.) of the mud. After ageing for 18 hours at 65.5° C., the measurements are repeated. Before and after the ageing, the electrical stability (ES) is measured in volt, using the Fann model 23D.

Acetals according to Examples I–VI as a base for the invert-emulsion muds 1 to 6

D=comparison sample based on diesel oil

WL=water loss

SV=apparent viscosity (mPa s)

PV=plastic viscosity (mPa s)

FL=flow limit (lb/100 sq ft)

10" gel=(lb/100 sq ft)

10' gel=(lb/100 sq ft)

The values for SV, PV, FL, 10" gel and 10' gel were determined according to API Recommended Practice, Standard Procedure of Field Testing Water-Based and Drilling Fluids 13 B-1 (RP 13 B-1), Section 2, and the values for WL were determined according to the same standard, Section 3.

Test results: Invert-emulsion muds 1 to 6

| | Before ageing | | | | | | |
|---|---|---|---|---|---|---|---|
| | 1 | 2 | 3 | 4 | 5 | 6 | D |
| ES (V) | 440 | 543 | 432 | 432 | 501 | 702 | 600 |
| WL cm³ | 1.4 | 0.6 | 1.8 | 1.1 | 0.7 | 0.6 | 0.9 |
| SV | 18 | 27 | 15 | 22 | 43 | 36 | 28.5 |
| PV | 16 | 24 | 13.5 | 21 | 32 | 29 | 16 |
| FL | 4 | 6 | 3 | 2 | 22 | 14 | 25 |
| 10" gel | 0.5 | 2.5 | 1 | 1 | 5 | 5 | 3 |
| 10' gel | 0.5 | 2.5 | 1 | 1 | 5 | 5 | 3 |

| | After ageing | | | | | | |
|---|---|---|---|---|---|---|---|
| | 1 | 2 | 3 | 4 | 5 | 6 | D |
| ES (V) | 456 | 634 | 500 | 600 | 530 | 794 | 750 |
| WL cm³ | 1.4 | 0.9 | 2.3 | 1.2 | 0.6 | 1.0 | 1.1 |
| SV | 20.5 | 31.5 | 18.5 | 27.5 | 50 | 42 | 33 |
| PV | 16 | 26 | 15 | 23 | 36 | 31 | 25 |
| FL | 9 | 11 | 7 | 9 | 28 | 22 | 16 |
| 10" gel | 2 | 4.5 | 2.5 | 3.5 | 14 | 10 | 6.5 |
| 10' gel | 2 | 4.5 | 2.5 | 3.5 | 14 | 10 | 6.5 |

By comparison with the sample based on diesel oil, the test results show that the compounds according to the invention are substitutes for mineral oils. By means of different combinations of aldehydes and alcohols in the acetals, these products have a very wide flexibility as a mineral oil substitute in their application. For the various fields of application, the required properties, especially the pour pointand viscosity, can be adjusted within a very wide interval.

An invert-emulsion mud of low density, for example below 1.20 g/cm³, can contain acetals having relatively long alkyl radicals for adjusting the hydrocarbon phase to a higher viscosity. If, however, it is necessary to drill at high densities, for example above 2.0 g/cm³, acetals having lower alkyl radicals are advisable. In this way, it is possible to adjust the hydrocarbon phase to viscosities which are below those of the normally usable mineral oils and virtually equate to that of water. Invert-emulsion muds based on low-viscosity acetals have a lower viscosity and a lower viscosity difference between above ground (about 20° C.) and the bottom of the well at great depths (for example 150° C.) than those based on mineral oil. It is possible in practice to formulate invert-emulsion muds optimized for defined depths and formations.

Testing the lubricating action of acetals as a mineral oil substitute in invert-emulsion muds The test is carried out using the "Extreme Pressure (EP) Lubricity Tester" part No. 212-1 from NL Baroid, NL Industries, Inc. With this, the relative lubricating power of mud fluids under extreme pressure is measured. At the same torque, the times in various lubricant media are measured at which a testing ring rotating against a testing block seizes. The comparison fluids used are the invert-emulsion muds 1 to 6 and D and also a water-based drilling mud with 4% of bentonite, whose weight was raised with baryte to a density of 1.46 g/cm³. The water-based drilling mud contains no added hydrocarbon.

Results of the lubrication test

I With the water-based drilling mud, seizing occurred at 300 inch/lbs after about 30 seconds.

II The muds 1 to 6 and D showed comparably good lubricating effects, and there was still no seizing after 5 minutes at 300 inch/lbs.

Invert-emulsion muds based on the acetals according to the invention differ significantly in their lubricating action from water-based drilling muds. They are comparable with invert-emulsion muds based on diesel oil. In this respect too, the acetals are good substitutes for mineral oil fractions such as diesel oil.

Comparative testing of the specific surface pressure of acetals and other oils.

The test is carried out using the Reichardt frictional wear balance (from Sommer und Runge, Berlin). In this test method, the specific surface pressure is measured.

The specific surface pressure of diesel oil, ®Shell-Gravex 915 (mixed-base typical oil from Shell, about 50% paraffin-based and about 50% naphthene-based), isobutyraldehyde di-2-ethylhexylacetal and acetaldehyde di-n-octylacetal is listed in the following Table.

Test results

| Lubricant | Specific surface pressure (bar) | % |
|---|---|---|
| Diesel oil | 68.2 | 100 |
| 200 Shell-Gravex 915 | 76.0 | 111.4 |
| Isobutyraldehyde di-2-ethylhexylacetal | 83.0 | 122.1 |
| Acetaldehyde di-n-octylacetal | 110 | 161 |

The higher the specific surface pressure at which lubrication collapses, the better is the lubricating action of the fluid. The results show that the acetals according to the invention are very suitable as the base or as a component of a lubricant formulation.

Testing the biodegradability

The biodegradability is tested by the modified Sturm test OECD 301 B, total degradation via $CO_2$ measurement. The percentage data relates to the theoretically possible quantity of $CO_2$. The $CO_2$ was measured over a period of 28 days.

| Substance | 10 mg/l | 20 mg/l | Results |
|---|---|---|---|
| Isobutyraldehyde di-2-ethylhexylacetal | 71% | 63% | biodegradable |
| Acetaldehyde di-n-octylacetal | 75% | 66% | biodegradable |

The testing of the biodegradability of isobutyraldehyde dibutylacetal is carried out according to the modified OECD Screening Test 301 E 12.

At 95% on average (relative to active compound), the test substance reaches 1×average threshold value of 70% DOC reduction (total degradation to $CO_2$ and $H_2O$ minimization).

The acetals according to the invention are distinguished by easy biodegradability and have a less toxic action on microorganisms.

We claim:

1. An invert-emulsion drilling mud or emulsion drilling mud, which contains an acetal based on an alcohol having at least 4 carbon atoms wherein said acetal wholly or partially replaces a base oil, oil component or mineral oil whereby said acetal forms an emulsion and said acetal is not water-miscible.

2. An invert-emulsion drilling mud or emulsion drilling mud, as claimed in claim 1, which contains an acetal

wherein $R^1$ is a carbon chain with 1–24 carbon atoms and $R^2$ is a carbon chain with 4–25 carbon atoms based on a monovalent aldehyde having 1 to 25 carbon atoms and on a monohydric alcohol having 4 to 25 carbon atoms.

3. An invert-emulsion drilling mud or emulsion drilling mud as claimed in claim 1, which contains an acetal based on dialdehyde having 2 to 10 carbon atoms and a monohydric alcohol.

4. An invert-emulsion drilling mud or emulsion drilling mud as claimed in claim 3, which contains an acetal in which the dialdehyde component has 2 to 10 carbon atoms and the alcohol component has 4 to 25 carbon atoms.

5. An invert-emulsion drilling mud or emulsion drilling mud, as claimed in claim 1, wherein the invert-emulsion drilling mud contains at least 0.5 by weight of acetals and the emulsion drilling mud contains 0.5 to 50% by weight of acetals.

6. An invert-emulsion drilling mud or emulsion drilling mud as claimed in claim 2, wherein the acetal is the product of the components comprising an aliphatic or aromatic monovalent aldehyde and an aliphatic or aromatic monohydric alcohol.

7. An invert-emulsion drilling mud or emulsion drilling mud as claimed in claim 3, wherein the acetal is the product of the components comprising an aliphatic or aromatic monovalent aldehyde and an aliphatic or aromatic monohydric alcohol.

8. A method for formulating a substantially biodegradable drilling mud composition, said method comprising:
   selecting a substantially biodegradable acetal according to the modified OECD screening test 301E12, and
   including in a drilling mud composition which contains water, an acetal which based on an alcohol having at least 4 carbon atoms.

9. A method as claimed in claim 8, wherein said acetal is the reaction product of the components consisting essentially of a monovalent aldehyde having 1 to 25 carbon atoms or a dialdehyde having 2 to 10 carbon atoms and a monohydric alcohol having 4 to 25 carbon atoms.

10. A method as claimed in claim 8, wherein a said composition is formulated as an emulsion and, when said formulating is complete, said composition contains about 0.5 to about 50% by weight of acetal.

11. A method as claimed in claim 8, wherein the acetal's pour point is from less than −70° C. up to −15° C. and viscosity is from 1.9 to 183 mPs and contains less than about 0.5% by weight of aromatic compounds.

12. A method as claimed in claim 8, wherein the acetal is the reaction product of the components comprising a dialdehyde having 2 to 10 carbon atoms and a monohydric alcohol having 4 to 20 carbon atoms.

13. A method as claimed in claim 8, wherein the acetal has a boiling point from 196° C. up to 300° C., and said composition, upon completing said formulating, is an invert-emulsion drilling mud.

14. A method as claimed in claim 8, wherein said composition, upon completing said formulating, is a water-based emulsion drilling mud, and wherein the amount of acetal in said drilling mud ranges from about 0.5 to about 50% by weight of said drilling mud.

15. A method as claimed in claim 8, comprising the step of including in a said composition a mineral oil or a polyglycol ether or a combination thereof.

16. The method as claimed in claim 12 wherein said dialdehyde is selected from the group consisting of glyoxal, tartaric acid dialdehyde, succindialdehyde, maleic acid dialdehyde and fumaric acid dialdehyde.

17. A method as claimed in claim 8, wherein the acetals have at least one of the following properties:

a) a pour point from less than −70° C. up to −15° C.

b) a boiling point from 196° C. up to 300° C. or c) a viscosity from 1.9 to 183 mPas.

* * * * *